(12) United States Patent
Ogasawara et al.

(10) Patent No.: US 9,711,277 B2
(45) Date of Patent: Jul. 18, 2017

(54) NON-CONTACT POWER SUPPLY SYSTEM

(75) Inventors: Kiyoshi Ogasawara, Osaka (JP);
Kaoru Furukawa, Osaka (JP);
Toshihiro Akiyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 666 days.

(21) Appl. No.: 14/232,505

(22) PCT Filed: Apr. 17, 2012

(86) PCT No.: PCT/JP2012/060335
§ 371 (c)(1),
(2), (4) Date: Jan. 13, 2014

(87) PCT Pub. No.: WO2013/011726
PCT Pub. Date: Jan. 24, 2013

(65) Prior Publication Data
US 2014/0145517 A1      May 29, 2014

(30) Foreign Application Priority Data

Jul. 20, 2011 (JP) .................................. 2011-159175

(51) Int. Cl.
*H01F 27/42* (2006.01)
*H01F 37/00* (2006.01)
(Continued)

(52) U.S. Cl.
CPC ............ *H01F 38/14* (2013.01); *H01M 10/46* (2013.01); *H02J 5/005* (2013.01); *H02J 7/0044* (2013.01); *H04B 5/0037* (2013.01); *H02J 7/025* (2013.01)

(58) Field of Classification Search
CPC .... H01J 17/00; G01B 7/14; H01F 5/00; H02J 7/00; B61B 13/08; H04B 5/00
(Continued)

(56) References Cited

U.S. PATENT DOCUMENTS 3,951,075 A * 4/1976 Miericke ................. B60L 13/04
                                                                104/281
7,521,890 B2 * 4/2009 Lee .......................... H02J 5/005
                                                                320/108
(Continued)

FOREIGN PATENT DOCUMENTS

GB          2 440 571 A      2/2008
JP       2003-204637 A      7/2003
(Continued)

OTHER PUBLICATIONS

Office Action for corresponding Taiwanese Application No. 10320534920, dated Apr. 22, 2014.
(Continued)

*Primary Examiner* — Rexford Barnie
*Assistant Examiner* — Jagdeep Dhillon
(74) *Attorney, Agent, or Firm* — Renner, Otto, Boisselle & Sklar, LLP

(57) ABSTRACT

A non-contact power supply system includes a power supply device and a power reception device. The power supply device includes primary coils arranged on a power supply surface and configured to be excited at an operational frequency. The power reception device includes a secondary coil configured to induce current using resonance phenomenon based on alternating flux from the primary coils when arranged on the power supply surface. The operational frequency that excites the primary coil is set at or in the proximity of a resonance frequency of a resonance system formed when the secondary coil is located at an intermediate position between two of the primary coils that are adjacent to each other.

2 Claims, 6 Drawing Sheets

(51) Int. Cl.
  *H01F 38/00* (2006.01)
  *H01F 38/14* (2006.01)
  *H01M 10/46* (2006.01)
  *H02J 5/00* (2016.01)
  *H02J 7/00* (2006.01)
  *H04B 5/00* (2006.01)
  *H02J 7/02* (2016.01)

(58) Field of Classification Search
  USPC .................. 307/104, 149, 109, 108, 64, 66;
  324/207.17, 207.16, 207.26; 104/148 SS;
  455/41.1; 320/108
  See application file for complete search history.

(56) References Cited

U.S. PATENT DOCUMENTS

| | | | |
|---|---|---|---|
| 7,880,337 B2 | 2/2011 | Farkas | |
| 8,212,520 B2* | 7/2012 | Takada | B60L 11/182 180/65.27 |
| 2004/0130318 A1* | 7/2004 | Saltsov | G01D 5/204 324/207.17 |
| 2004/0130916 A1 | 7/2004 | Baarman | |
| 2006/0285367 A1* | 12/2006 | Yasumura | H01F 37/00 363/21.03 |
| 2007/0145830 A1* | 6/2007 | Lee | H02J 5/005 307/135 |
| 2009/0001941 A1 | 1/2009 | Hsu et al. | |
| 2010/0066176 A1 | 3/2010 | Azancot et al. | |
| 2010/0190436 A1* | 7/2010 | Cook | H04B 5/00 455/41.1 |
| 2010/0244580 A1 | 9/2010 | Uchida et al. | |
| 2011/0279214 A1* | 11/2011 | Lee | H01F 17/08 336/220 |
| 2011/0285210 A1 | 11/2011 | Lemmens et al. | |
| 2012/0007437 A1 | 1/2012 | Fells et al. | |
| 2012/0169135 A1* | 7/2012 | Yamamoto | B60L 11/182 307/104 |

FOREIGN PATENT DOCUMENTS

| | | |
|---|---|---|
| JP | 2008-005573 A | 1/2008 |
| JP | 2010-183812 A | 8/2010 |
| JP | 2010-239769 | 10/2010 |
| JP | 2010-538596 A | 12/2010 |
| JP | 2011-507481 A | 3/2011 |
| TW | 201103224 A | 1/2011 |
| WO | WO 2009/027674 A1 | 3/2009 |
| WO | WO 2009/081115 A1 | 7/2009 |

OTHER PUBLICATIONS

International Search Report for corresponding International Application No. PCT/JP2012/060335 mailed May 22, 2012.

Chuen et al., "Basic Study of Improving Efficiency of Wireless Power Transfer via Magnetic Resonance Coupling Based on Impedance Matching", IEEE International Symposium on Industrial Electronics, 2010.

Supplementary European Search Report for corresponding European Application No. EP 12814139.7, dated Nov. 14, 2014.

International Preliminary Report on Patentability for corresponding International Application No. PCT/JP2012/060335 mailed May 22, 2012 (English translation).

Japanese Office Action for corresponding Japanese Application No. 2011-159175 dated Jan. 20, 2015.

\* cited by examiner

Directly Opposed Position

Intermediate Position (Position Deviated)

NON-CONTACT POWER SUPPLY SYSTEM

TECHNICAL FIELD

The present invention relates to a non-contact power supply system that supplies power to the power reception device in a non-contact manner.

BACKGROUND ART

In the prior art, a non-contact power supply system supplies power in a non-contact manner from a power supply device to a power reception device (for example, refer to patent document 1). In a non-contact power supply system of the prior art, to supply power, the power reception device is arranged on the power supplying device at a determined position. Power is supplied from the power supply device to the power reception device only under this condition.

Over these recent years, to improve user convenience, study has been conducted to develop a free layout type non-contact power supply system that allows for the power reception device to be supplied with power by arranging the power reception device at any position on the upper surface (power supplying surface) of the power supply device (for example, refer to patent document 2).

As shown in FIG. 5A, in a free layout type non-contact power supply system, primary coils L1 are arranged in a power supply device 10 along a power supply surface 6 of the power supply device 10. A power reception device 30 includes a secondary coil L2. In FIG. 5A, the secondary coil L2 is directly opposed to a primary coil L1. The primary coil L1 is excited at an operational frequency f1. A change in the magnetic flux from the excited primary coil L1 induces current at the secondary coil L2. The induced current becomes the output power of the power reception device 30. In this manner, electromagnetic induction is used to supply power from the power supply device 10 to the power reception device 30.

Patent Document 1: Japanese Laid-Open Patent Publication No. 2003-204637

Patent Document 2: Japanese Laid-Open Patent Publication No. 2008-5573

SUMMARY OF THE INVENTION

In a non-contact power supply system of the prior art (system that is not of a free layout type), as shown in FIG. 7, the operational frequency f1 of the primary coil L1 is set to conform to a resonance frequency fr of a resonance system when the secondary coil L2 is directly opposed to the primary coil L1. The resonance frequency fr is the resonance frequency of the secondary coil L2. In the non-contact power supply system of the prior art, the power reception device is arranged at a determined position relative to the power supply device. This allows for the secondary coil to be directly opposed to the primary coil when supplying power. Thus, by setting the operational frequency f1 at the resonance frequency fr, the power reception device 30 may obtain the maximum output power W1.

In the free layout type non-contact power supply system, the power reception device 30 does not have to be arranged at any particular position as long as it is arranged on the power supply surface 6. Thus, as shown in FIG. 5B, the secondary coil L2 may be arranged at an intermediate position between two primary coils L1. When the secondary coil L2 is located at a position directly opposed to a primary coil L1, the leakage inductance Le is minimal. The leakage inductance Le increases as the secondary coil L2 becomes farther along the power supply surface 6 from a directly opposed position.

It is known that the resonance frequency fr decreases as the leakage inductance Le increases. Thus, as shown by the arrow in FIG. 7, the resonance frequency fr of the resonance system decreases in accordance with the positional deviation of the secondary coil L2 from the primary coil L1. Thus, the output power at an intermediate position between primary coils L1 becomes output power W2, which is drastically decreased from output power W1 obtained at the directly opposed position. In this manner, in the free layout type non-contact power supply system, the output power of the power reception device 30 varies greatly depending on where the power reception device 30 is located, and it is difficult to obtain stable output power.

Accordingly, it is an object of the present invention to provide a non-contact power supply system that allows for stable output power to be obtained regardless of where a secondary coil is located.

One aspect of the present invention is a non-contact power supply system including a power supply device, which includes primary coils arranged on a power supply surface and configured to be excited at an operational frequency, and a power reception device, which includes a secondary coil configured to induce current using resonance phenomenon based on alternating flux from the primary coils when arranged on the power supply surface. In the non-contact power supply system, the operational frequency that excites the primary coil is set at or in the proximity of a resonance frequency of a resonance system formed when the secondary coil is located at an intermediate position between two of the primary coils that are adjacent to each other.

In the above configuration, the non-contact power supply system may include a capacitor connected to the secondary coil. In this configuration, preferably, capacitance of the capacitor is adjusted to set the operational frequency at or in the proximity of the resonance frequency of the resonance system corresponding to the intermediate position.

In the above configuration, preferably, the proximity of the resonance frequency is a frequency region at which output power of the power reception device obtained by the resonance system corresponding to the intermediate position is greater than or equal to an output power of the power reception device obtained by a resonance system formed when the secondary coil is located at a position directly opposed to one of the primary coils.

In the above configuration, preferably, in the proximity of the resonance frequency at the resonance system of the intermediate position, the operational frequency is set to differ from the resonance frequency.

DESCRIPTION OF THE EMBODIMENTS

One embodiment of a non-contact power supply system will now be described with reference to FIGS. 1 to 6.

Figure 1:
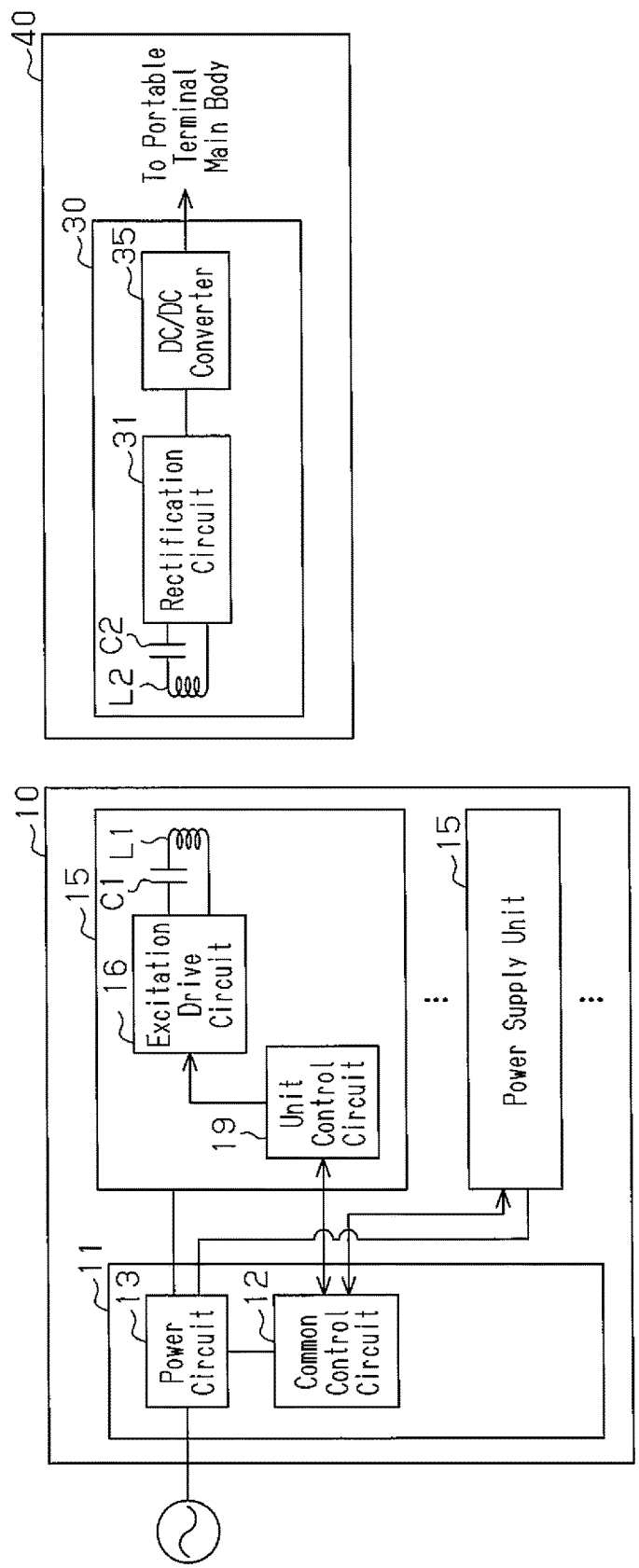
FIG. 1 is a block diagram showing the configuration of a non-contact power supply system.

As shown in FIG. 1, the non-contact power supply system includes a power supply device 10 and a power reception device 30. In the present example, the power reception device 30 is incorporated in a portable terminal 40. The detailed configurations of the power supply device 10 and the power reception device 30 will now be described.

[Power Supply Device]

Figure 2:
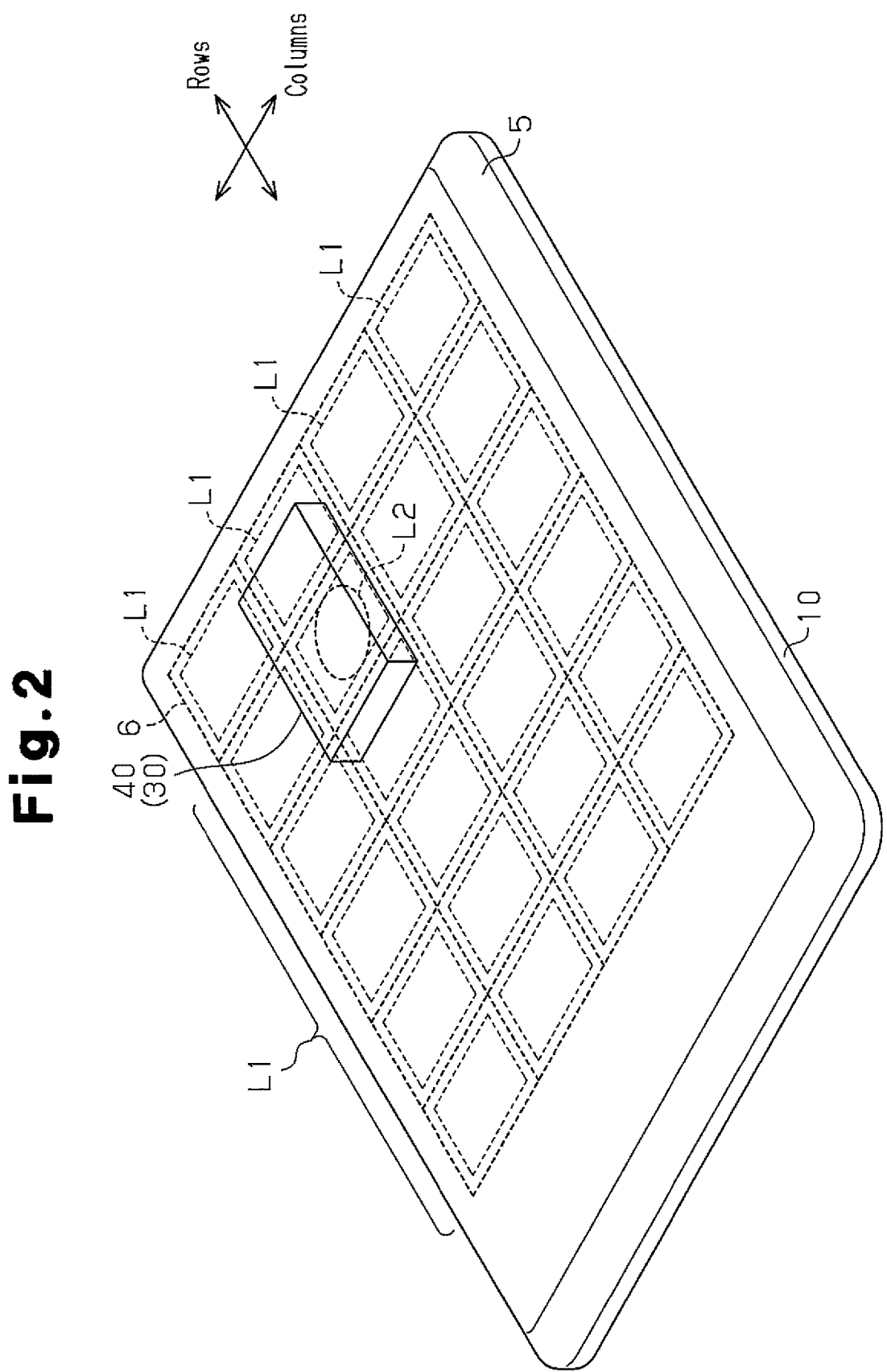
FIG. 2 is a perspective view of a power supply device.

As shown in FIG. 2, the power supply device 10 includes a planar case 5. The case 5 includes an upper surface that defines a power supply surface 6 on which the portable terminal 40 is arranged. Primary coils L1 are arranged throughout the entire region of the power supply surface 6 in the case 5. In the present example, twenty-four primary coils L1 are arranged in four rows and six columns in a matrix-like manner in the power supply surface 6.

As shown in FIG. 1, the power supply device 10 includes a single common unit 11 and a plurality of (in the present example, twenty-four, which is the same number as the primary coils L1) power supply units 15.

The common unit 11 includes a power circuit 13 and a common control circuit 12. The power circuit 13 converts AC power from an external power source to suitable DC voltage and supplies the DC voltage as operational power to each power supply unit 15 and the common unit 11.

The common control circuit 12, which is configured by a microcomputer, centrally controls the power supply device 10 by providing various command signals to each power supply unit 15.

The power supply unit 15 includes a unit control circuit 19, an excitation drive circuit 16, and a primary coil L1.

When the unit control circuit 19 receives a command signal from the common control circuit 12 requesting for the supply of power, the unit control circuit 19 controls the excitation drive circuit 16.

The two ends of the primary coil L1 is connected to the excitation drive circuit 16. A capacitor C1 is connected between one end of the primary coil L1 and the excitation drive circuit 16. The excitation drive circuit 16 generates AC current having operational frequency f1 under the control of the unit control circuit 19 and supplies the primary coil L1 and the capacitor C1 with the AC current. This excites the primary coil L1. Here, the magnetic flux generated from the primary coil L1 changes.

[Power Reception Device]

As shown in FIG. 1, the power reception device 30 includes a rectification circuit 31 and a DC/DC converter 35.

Two ends of a secondary coil L2 are connected to the rectification circuit 31. A capacitor C2 is connected between one end of the secondary coil L2 and the rectification circuit 31. The secondary coil L2 induces current based on changes in the magnetic flux from a primary coil L1. The rectification circuit 31 rectifies DC voltage induced by the secondary coil L2. The DC/DC converter 35 converts DC voltage from the rectification circuit 31 to a value suitable for the operation of the portable terminal 40. The DC voltage may be used, for example, to charge a rechargeable battery (not shown), which is the operational power source of the portable terminal 40.

The resonant characteristics of the non-contact power supply system will now be described.

Figure 3:
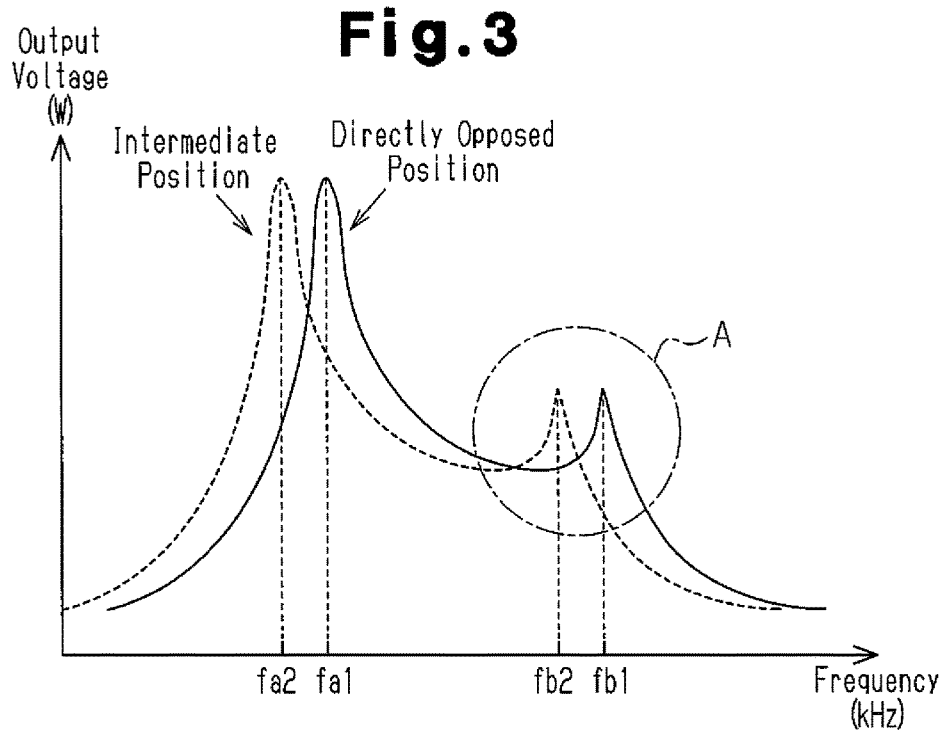
FIG. 3 is a graph showing a resonance system including primary and secondary frequencies.

FIG. 3 is a graph for a resonance system showing the output power of the power reception device 30 in correspondence with the operational frequency of the primary coil L1. As shown in FIG. 3, the resonance system of the present embodiment includes two resonance frequencies, namely, a primary resonance frequency fa1 and a secondary resonance frequency fb1. The primary resonance frequency fa1 is lower than the secondary resonance frequency fb1. The resonance frequencies fa1 and fb1 are the resonance frequencies when the secondary coil L2 is located at a position directly opposed to a primary coil L1.

When the operational frequency f1 that excites the primary coil L1 is set as the primary resonance frequency fa1, the impedance excessively decreases when the two coils L1 and L2 are magnetically coupled. Accordingly, to use the secondary resonance frequency fb1 in the present example, the operation frequency f1 that excites the primary coil L1 is set in the proximity of the secondary resonance frequency fb1. By setting the operational frequency f1 in the proximity of the secondary resonance frequency fb1, excessive decrease of the impedance is suppressed. The resonance frequency is obtained from the following equation.

Equation 1

$$\text{resonance frequency} = \frac{1}{2\pi\sqrt{Le \cdot C}} \qquad (1)$$

Figure 5A:
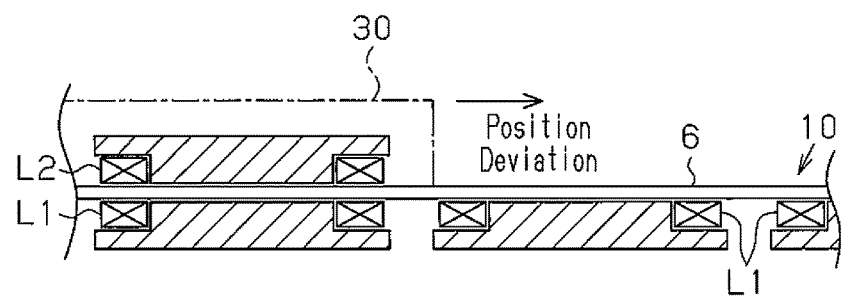
FIG. 5A is a partial cross-sectional view of a power supply device and a power reception device when a secondary coil L2 is located at a directly opposed position.
Figure 5B:
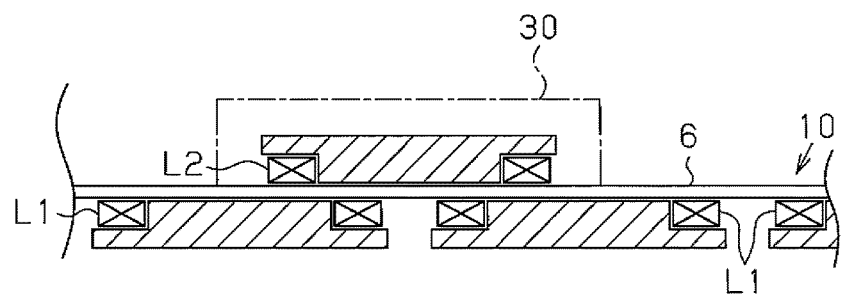
FIG. 5B is a partial cross-sectional view of the power supply device and the power reception device when the secondary coil L2 is located at an intermediate position.

It is apparent from equation (1) that the resonance frequency decreases as the leakage inductance Le or the capacitance C of the capacitor increases. For example, when the secondary coil L2 is shifted in the planar direction of the power supply surface 6 from the position of FIG. 5A directly opposed to the primary coil L1, the shifting increases the leakage inductance Le. In this case, the resonance system (resonance curve) shown by the solid lines in FIG. 3 is moved in the direction in which the resonance frequency decreases. As shown in FIG. 5B, when the secondary coil L2 is arranged at an intermediate position, which is located at a middle position between two adjacent primary coils L1, the resonance system (resonance curve) is set at the frequency shown by the broken lines in FIG. 3. In this manner, the primary resonance frequency fa2 and the secondary resonance frequency fb2 at the intermediate position are respectively smaller than the secondary resonance frequency fa1 and the secondary resonance frequency fb2.

As shown by equation (1), adjustment of the capacitance C of the capacitor C2 allows the resonance frequency (frequency region of resonance region) for the operation frequency f1 to be set. In this case, the operational frequency f1 may be fixed.

Figure 4:
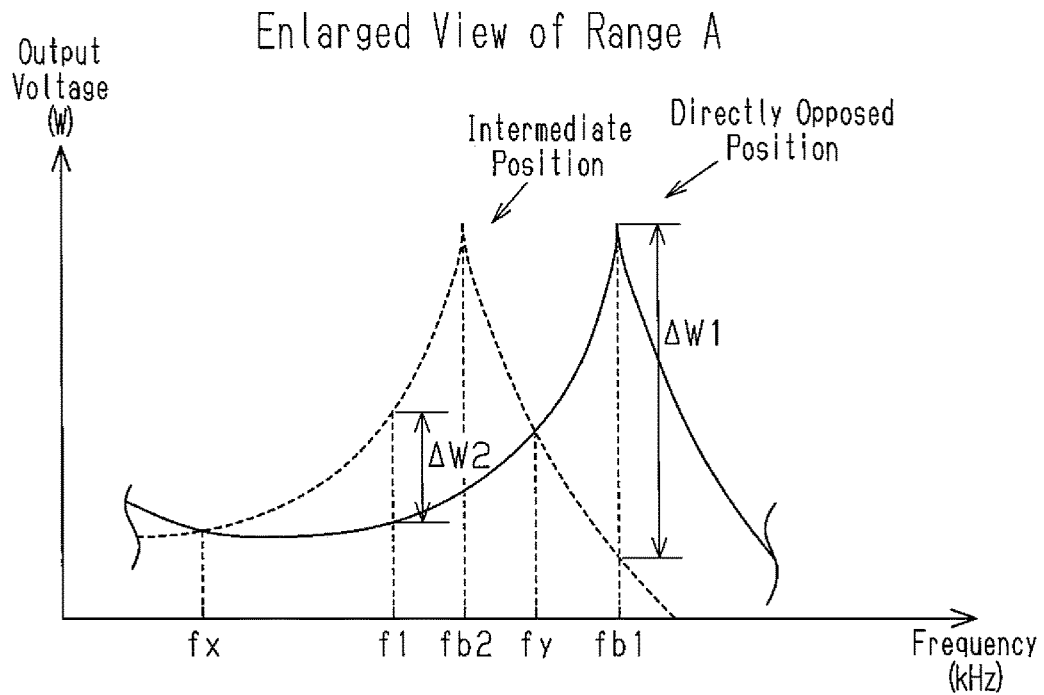
FIG. 4 is an enlarged view of the resonance curve in range A of FIG. 3.
Figure 6A:
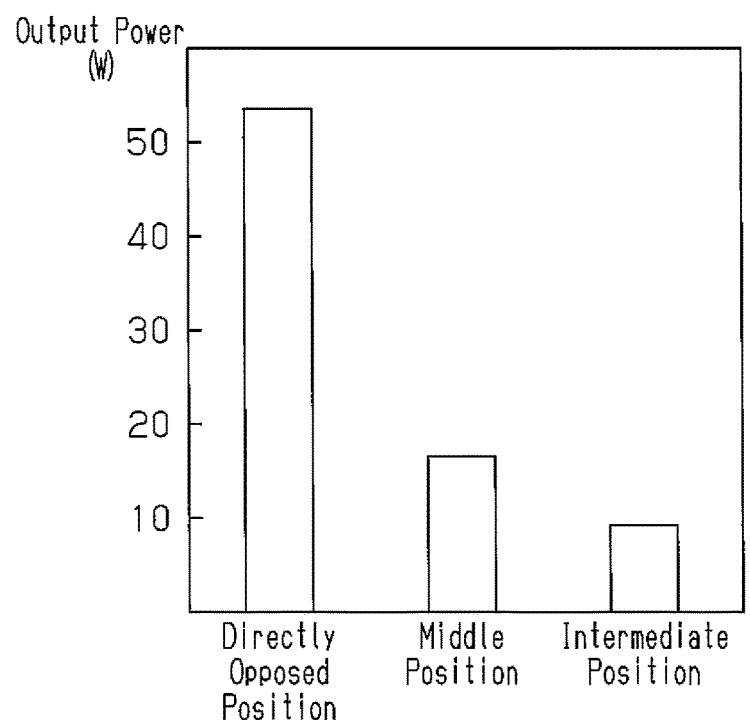
FIG. 6A is a graph showing the output power of the power reception device in correspondence with the position of the secondary coil L2 in the setting of a prior art resonance system.

FIG. 4 is an enlarged view of the resonance curve in range A of FIG. 3. As shown in FIG. 4, in the same manner as the background art described above, when the operation frequency f1 is set as the resonance frequency fb1 at the directly opposed position, the difference ΔW1 becomes maximal between the output power of the power reception device 30 at the intermediate position and the output power of the power reception device 30 at the directly opposed position. In this case, as shown by the graph of FIG. 6A, the output power of the power reception device 30 is maximal (approximately 50 W) at the directly opposed position. When the secondary coil L2 is located at a middle position between the directly opposed position and the intermediate position, the output power of the power reception device 30 is less than 20 W. When the secondary coil L2 is located at the intermediate position, the output power of the power reception device 30 is approximately 10 W. Accordingly, when the operational frequency f1 is set as the resonance frequency fb1 at the directly opposed position, the output power when the secondary coil L2 is located at the intermediate position is decreased to approximately 20% of the output power at the directly opposed position.

In the present embodiment, the capacitance C of the capacitor C2 is adjusted to set the position of the resonance system for the operational frequency f1 so that the difference decreases between the output power of the power reception device 30 at the intermediate position and the output power of the power reception device 30 at the directly opposed position. In the present example, the operational frequency f1 is set in the proximity of the resonance frequency fb2 at the intermediate position. As shown in FIG. 4, the proximity of the resonance frequency fb2 is the frequency region between two intersecting points fx and fy of the resonance system corresponding to the intermediate position (resonance curve shown by broken lines) and the resonance system corresponding to the directly opposed position (resonance curve shown by solid lines). That is, the resonance system of the present embodiment is set so that the operational frequency f1 is located between the two intersecting points fx and fy. When the operational frequency f1 is set between the two intersecting points fx and fy, the output power at the intermediate position becomes greater than or equal to the directly opposed position.

Figure 6B:
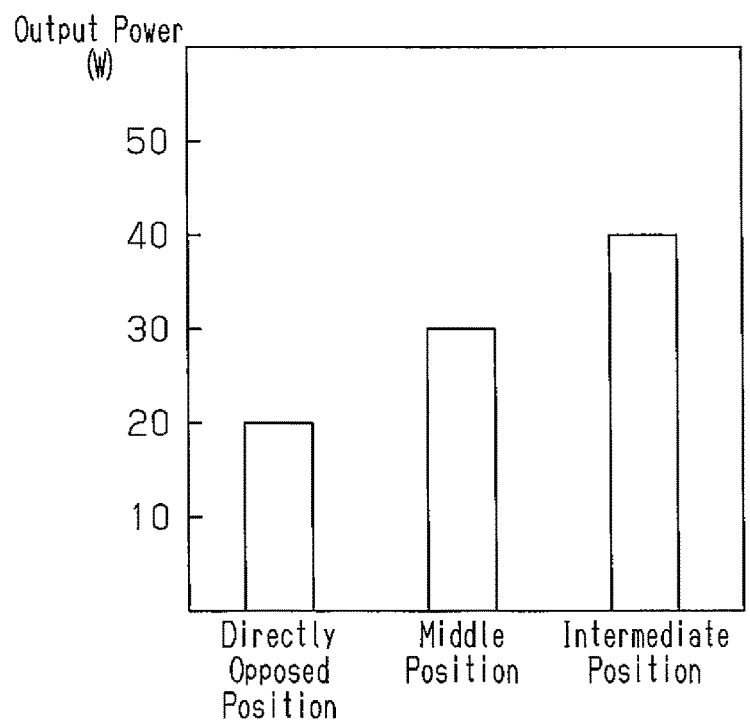
FIG. 6B is a graph showing the output power of the power reception device in correspondence with the position of the secondary coil L2 in the setting of the resonance system of the present invention.
Figure 7:
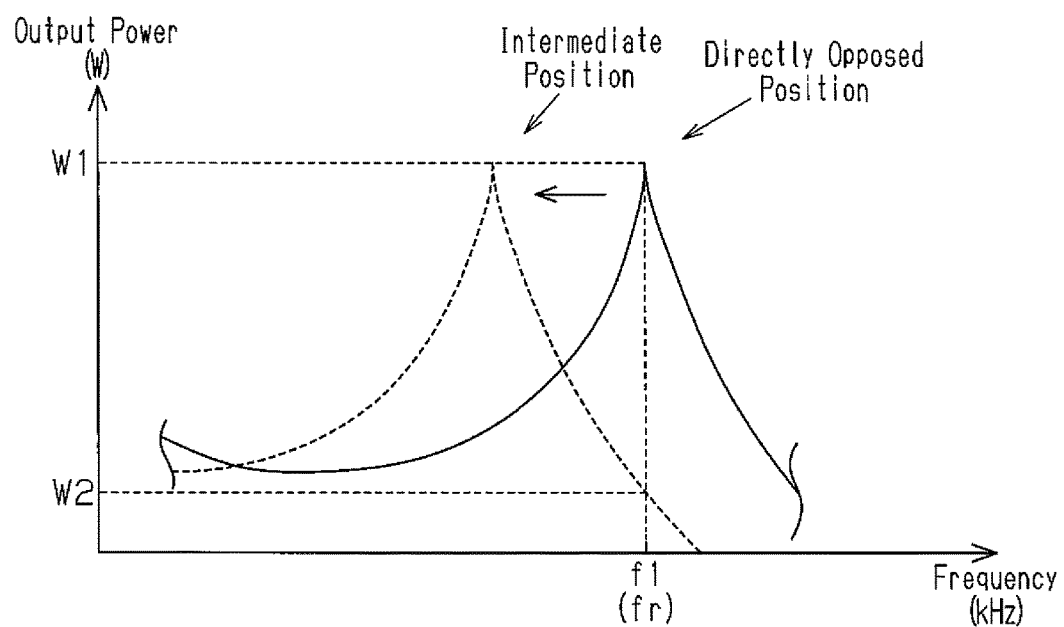
FIG. 7 is a graph for a non-contact power supply system of the background art showing a resonance system when the secondary coil is located at a directly opposed position and when the secondary coil is located at an intermediate position.

When the operational frequency f1 is set in the proximity of the resonance frequency fb2, the difference ΔW2 of the output power of the power reception device 30 at the intermediate position and the output power of the power reception device 30 at the intermediate position becomes smaller than the difference ΔW1. In this case, as shown by the graph of FIG. 6B, the output power of the power reception device 30 is maximal (approximately 40 W) at the intermediate position. When the secondary coil L2 is located at an intermediate position between the directly opposed position and the intermediate position, the output power of the power reception device 30 is approximately 30 W. Further, when the secondary coil L2 is located at the directly opposed position, the output power of the power reception device 30 is approximately 20 W. Accordingly, in this configuration, the decrease rate of the output voltage from the directly opposed position to the intermediate position is only about 50%. This allows for the power reception device 30 to obtain further stable output power regardless of the position of the secondary coil L2.

The non-contact power supply system of the present embodiment has the advantages described below.

(1) The operation frequency f1 is set in the proximity of the resonance frequency fb2 at the intermediate position. Thus, in comparison with when, for example, the operation frequency f1 is set as the resonance frequency at the directly opposed position, the output power difference of the power reception device 30 between the intermediate position and the directly opposed position becomes small. Thus, further stable output power may be obtained from the power reception device 30 regardless of where the secondary coil L2 is located.

(2) Adjustment of the capacitance of the capacitor C2 sets the position of the resonance system for the operational frequency f1. Thus, for example, even when the operational frequency f1 is specified in advance by a standard or the like, while fixing the operational frequency f1 in compliance with the standard, further stable output power of the power reception device 30 may be obtained.

(3) Further, the operational frequency f1 is set to differ from the resonance frequency fb2 at the intermediate position. When the operational frequency f1 conforms to the resonance frequency fb2 at the intermediate position, the output power difference of the power reception device 30 becomes large although this is not as large as when the operation frequency f1 conforms to the resonance frequency fb1 as the directly opposed position. Accordingly, the output power difference of the power reception device 30 may be further decreased by setting the operational frequency f1 differently from the resonance frequency fb2 at the intermediate position.

The above embodiment may be modified to the forms described below.

In the above embodiment, the capacitance C of the capacitor C2 is adjusted to set the position of the resonance system for the operational frequency f1. However, the operational frequency f1 may be changed to set the operational frequency f1 in the proximity of the resonance frequency fb2 at the intermediate position.

In the above embodiment, the proximity of the resonance frequency fb2 is the frequency region between two intersecting points fx and fy of the resonance curve corresponding to the intermediate position and the resonance curve corresponding to the directly opposed position. However, as long as the output power difference of the power reception device 30 decreases between the intermediate position and the directly opposed position compared to when the operation frequency f1 is set as the resonance frequency fb1, the operational frequency f1 does not have to be set to this frequency region f1. For example, the operational frequency f1 may be set to a smaller frequency region than the intersecting point fx, and the operational frequency f1 may be set to a larger frequency region than the intersecting point fy. That is, the frequency region in the proximity of the resonance frequency fb2 may be a wider range.

The resonance system may be set at a position where the operational frequency f1 conforms to the resonance frequency fb2 at the intermediate position. This also obtains a stable output voltage in comparison to when the operational frequency f1 is set to the proximity of the resonance frequency fb1 (in particular, frequency region that is higher than the resonance frequency fb1).

In the above embodiment, the unit control circuit 19 may be omitted. In this case, the common control circuit 12 also performs the control executed by the unit control circuit 19 in the above embodiment. Further, some of the control performed by the unit control circuit 19 may be performed by the common control circuit 12, and some of the control performed by the common control circuit 12 may be performed by the unit control circuit 19.

In the above embodiment, coil L1 and the capacitor C1 are connected in series but may be connected in parallel.

Further, the coil L2 and the capacitor C2 are connected in series but may be connected in parallel.

The invention claimed is:

1. A non-contact power supply system comprising:
a power supply device, which includes primary coils arranged on a power supply surface and configured to be excited at an operational frequency;
a power reception device, which includes a secondary coil configured to induce current using resonance phenomenon based on alternating flux from the primary coils when arranged on the power supply surface; and
a capacitor connected to the secondary coil, wherein
capacitance of the capacitor is adjusted such that the operational frequency that excites the primary coil is set in the proximity of a resonance frequency of a resonance system formed when the secondary coil is located at an intermediate position between two of the primary coils that are adjacent to each other,
the proximity of the resonance frequency is a frequency region between two intersecting points of a resonance curve, which represents the resonance system formed when the secondary coil is located at the intermediate position, and a resonance curve, which represents a resonance system formed when the secondary coil is located at a directly opposed position at which the secondary coil is directly opposed to one of the primary coils, and
when the operational frequency is set in the frequency region, an output power of the power reception device at the intermediate position is greater than or equal to an output power of the power reception device at the directly opposed position.

2. The non-contact power supply system according to claim 1, wherein
in the proximity of the resonance frequency at the resonance system of the intermediate position, the operational frequency is set to differ from the resonance frequency.

* * * * *